United States Patent [19]
Gordon et al.

[11] Patent Number: 5,777,063
[45] Date of Patent: Jul. 7, 1998

[54] OPTICALLY ACTIVE INDANE POLYMERS

[75] Inventors: Janet L. Gordon, Clifton Park; Kevin R. Stewart, Schenectady; Kwok Pong Chan, Troy, all of N.Y.

[73] Assignee: Molecular OptoElectronics Corporation, Watervliet, N.Y.

[21] Appl. No.: 957,567

[22] Filed: Oct. 24, 1997

[51] Int. Cl.$^6$ .................................................. C08G 18/28
[52] U.S. Cl. ............................ 528/74; 528/190; 528/201
[58] Field of Search ............................ 528/74, 190, 201

[56] References Cited

U.S. PATENT DOCUMENTS

| | | | |
|---|---|---|---|
| Re. 34,431 | 11/1993 | Brunelle et al. | 528/352 |
| 2,754,285 | 7/1956 | Petropoulos | 260/47 |
| 2,979,534 | 4/1961 | Petropoulos et al. | 260/619 |
| 3,634,089 | 1/1972 | Hamb | 96/87 |
| 4,334,106 | 6/1982 | Dai | 568/719 |
| 4,950,731 | 8/1990 | Faler et al. | 528/201 |
| 5,424,389 | 6/1995 | Wimberger et al. | 528/201 |

FOREIGN PATENT DOCUMENTS 0 621 297 A2   10/1994   European Pat. Off.

OTHER PUBLICATIONS

Daniel J. Brunelle, "Transesterification Chemistry, Low Temperature Reactions of o–Nitrophenyl Carbonates," Macromolecular Reports A28(Suppl. 2), 95–102 (1991).

K.C. Stueben, "Polymers Containing the 3,3,3',3'-Tetramethyl-1,1'-Spirobiindane Residue," Poly. Sci. Part A, 3, 3209–3217 (1965).

P. Pelet and N. Engheta, "The Theory of Chirowaveguides," IEEE Transactions On Antennas and Propagation 38, 90–98, (1990).

J.C. Wilson, "Polyamides and Polyesters Derived from 1,1,3-Trimethyl-3-(p-aminophenyl)-5-inadanamine and 1,1,3-Trimethyl-3-(p-hydroxyphenyl)-5-indanol", J. Poly. Sci.: Polymer Chemistry Ed. 13, 749–754 (1975).

John C. Petropoulos and James J. Fisher, "The Dimers of Ring Substituted Alpha–Metylstyrenes", J. Amer. Chem. Soc. 80, 1938–41 (1958).

*Primary Examiner*—Rachel Gorr
*Attorney, Agent, or Firm*—Heslin & Rothenberg, P.C.; Martha L. Boden, Esq.

[57] ABSTRACT

Optically active polycarbonate, polyester, and polyurethane polymers prepared from monomers containing optically pure indane moieties are disclosed. The chiral indane polymers are of high molecular weight and exhibit high optical rotations. In addition, the optically active polymers are useful in the fabrication of optoelectronics devices and as polarizing coatings or filters or as polarized lenses.

21 Claims, No Drawings

OPTICALLY ACTIVE INDANE POLYMERS

The following invention was made with Government support under contract number F33615-95-C-5432 awarded by the United States Air Force. The Government has certain rights in this invention.

FIELD OF THE INVENTION

The present invention relates to chiral polymers derived from indane bisphenols, and more particularly to high molecular weight optically active linear indane polycarbonate, polyester, and polyurethane polymers.

BACKGROUND OF THE INVENTION

Chiral materials exhibiting no center of symmetry are isotropic birefringent materials having a "handed" molecular structure. This handedness makes them optically active and capable of rotating a plane of polarized light transmitted through them. Polarizing coatings and filters comprise birefringent materials capable of transforming light into polarized light. Thus, chiral materials may be used as polarizers in the fabrication of plane polarized lenses and polarizing coatings and filters.

Recently, Pelet and Engheta in *IEEE Transactions on Antennas and Propagation* 38, 90–98 (1990) have suggested the use of optically active materials in guided-wave structures to produce chiral waveguides. A chiral waveguide, also known as a chirowaveguide, comprises a cylindrical waveguide or parallel conducting plates filled with a homogeneous isotropic chiral material. Applications for chiral waveguides include integrated optical devices, telecommunications electronics systems, printed-circuit elements, and optoelectronics devices.

Organic polymers are known to be compatible with semiconductor electronics technology, can withstand high temperatures during processing, and have a large capacity for engineered properties. In addition, it is well-known that high molecular weight polycarbonates are excellent materials for optical applications because of their inherent toughness, durability, resistance to heat and cold, and clarity. The most familiar linear polycarbonates are homopolymers derived from 2,2-bis(4-hydroxyphenyl)propane, commonly known as bisphenol-A (also referred to herein as "BPA"). Polycarbonates derived from BPA are optical quality plastics that can be injection molded to form optical materials such as lenses, substrates for optical storage media including compact disks, and automotive tail lights, for example.

Less familiar polycarbonates are those reported by Wimberger Friedl et al. in U.S. Pat. No. 5,424,389 and European Patent Application 0621297A2 and disclosed by Faler et al. in U.S. Pat. No. 4,950,731. These polycarbonates comprise random copolycarbonates of BPA and 6,6'-dihydroxy-3,3,3', 3'-tetramethyl-1,1'-spirobiindane (also referred to herein as "SBI"), which also exhibit the requisite properties necessary for such optical applications. Random copolycarbonates comprising BPA and SBI are also reported by K. C. Stueben in *J. Poly Sci.*, Part A, 3, 3209–17 (1965). Copending commonly assigned applications, U.S. Ser. Nos. 08/920,931 and 08/798,756 (U.S. Pat. No. 5,703,197), disclose alternating linear polycarbonates derived from spirobiindanols and dihydroxyaromatic compounds, homopolycarbonates derived from indanols, and random and alternating polycarbonates derived from indanols and biphenols and bisphenols. The aforementioned polycarbonates are also transparent and exhibit excellent thermal and mechanical properties.

Poly(aryl)esters, or polyarylates, are high molecular weight aromatic polyesters derived from aromatic dicarboxylic acids and phenols. Polyarylates are known to exhibit mechanical and thermal properties similar to those of polycarbonates. In particular, they are thermally stable at high temperatures, resilient, tough, durable, hydrolytically resistant, transparent, and exhibit excellent processability. The most common polyarylates are those prepared by the reaction of isophthaloyl and terephthaloyl chlorides with BPA.

J. C. Wilson discloses polyesters containing derivatives of racemic indane compounds in *J. Polymer Science: Polymer Chemistry* Ed. 13, 749–754 (1975). The racemic indane polyesters were found to exhibit high glass transition temperatures ranging from 244° C. to 272° C. In addition, U.S. Pat. No. 3,634,089 to Hamb discloses polyesters prepared from racemic indane bisphenol compounds and specific bisphenols, such as BPA. The polymers exhibited a weight average molecular weight of at least 30 kg/mole, a glass transition temperature of at least 200° C., desirable thermal properties, and good optical clarity.

Polyurethane polymers are high molecular weight thermoplastic polymers useful in a variety of forms, such as fibers, coatings, elastomers, and foams. As coatings, the polyurethanes exhibit excellent hardness, flexibility, abrasion and hydrolytic resistance, and adhesion. In addition, they are tough, durable, and thermally stable at high temperatures. Polyurethanes are often used as wire coatings in electrical applications. The Stueben reference mentioned above discloses polyurethane polymers prepared from racemic SBI.

In general, most applications of synthetic polymers require good thermal stability to withstand high temperature processing (>150° C.), but do not require optical activity. However, for use in the formation of polarizing coatings, lenses, or filters and for utility as chiral waveguides in optoelectronics devices, birefringent materials having polarizing properties must be employed. Due to the low birefringence of the achiral prior art polycarbonate, polyester, and polyurethane polymers mentioned above, they are not useful in such applications.

A need therefore exists for optically active organic polymers that retain the same advantageous properties associated with high molecular weight polycarbonates, polyesters, and polyurethanes. In particular, such chiral polymers should have excellent processability and high molecular weight, and should be durable, tough, thermally stable and water resistant. The novel chiral indane polycarbonate, polyester, and polyurethane polymers of the present invention meet the above need.

SUMMARY OF THE INVENTION

The present invention is based on the discovery that compounds containing optically pure indane moieties can be polymerized to form a wide variety of unique optically active polymers. The novel chiral polymers of the present invention exhibit similar properties to those associated with the high molecular weight polymers mentioned above. However, unlike known polycarbonates, polyurethanes, and polyester polymers, the present optically active linear polymers have additional applications, such as in the field of optoelectronics in the fabrication of chiral waveguides. In addition, the present chiral polymers can be used as polarizing lenses, coatings, and/or filters. The present polymers are characterized by their high optical rotations and high molecular weights, typically between about 10 kg/mole and 500 kg/mole.

More particularly, the novel optically active linear polymers of the present invention are polymerized from monomers containing optically pure indane moieties of formulas (IA) and/or (IB) below, also referred to herein as "indanes". The chiral indane monomers are typically derived from the enantiomers of 5-hydroxy-3-(4-hydroxyphenyl)-1,1,3-tri ($R^2$)indanes, wherein $R^2$ is defined below. These dihydroxy compounds are referred to herein as "indanols" or "indane bisphenols". The chiral indanes may be substituted or unsubstituted.

The optically active linear indane polymers of the present invention comprise structural units having formula (IA) and formula (IB)

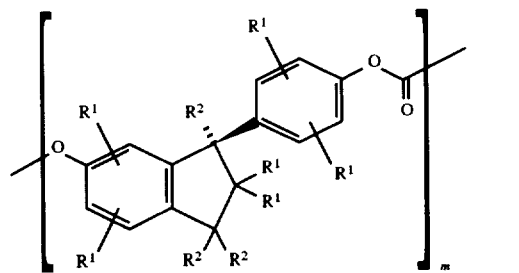

and structural units selected from the group having formulas (II)–(III) or (VI)–(XII)

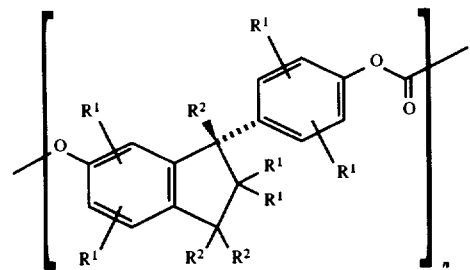

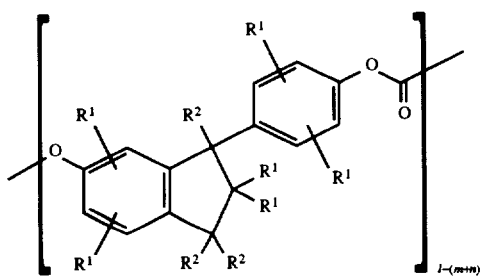

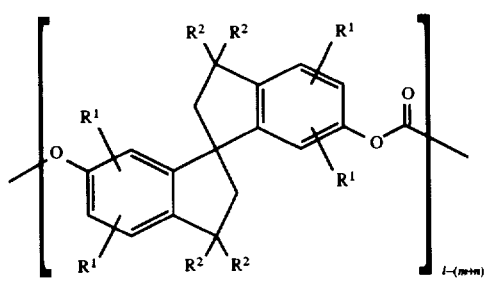

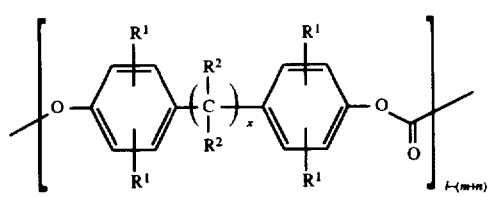

wherein m is the mole fraction of structural units (IA) in the polymers, and n is the mole fraction of structural units (IB). The numerical value of m and n is each independently from 0 to 1.0, and the numerical value of m differs from the numerical value of n. The sum of m and n is less than or equal to 1.0.

Structural moiety (II) is typically derived from a racemic substituted or unsubstituted indane bisphenol compound. The spirobiindane moiety of formula (III) is generally derived from a 6,6'-dihydroxy-3,3,3',3'-tetra($R^2$) spirobiindane, which may be substituted or unsubstituted.

In structural units (VI), x is 0 when (VI) is a moiety derived from a substituted or unsubstituted bisphenol. Alternatively, x is 1 when (VI) is derived from a substituted or unsubstituted bisphenol, such as bisphenol A, wherein each $R^2$ is methyl, or such as hexafluorobisphenol A wherein each $R^2$ is trifluoromethyl. In structural units (XI) y is 1 to 20. Structural units (IX)–(XI) are derived from corresponding diacid halides. When structural units having formula (IX), (X), (XI), or (XII), which is derived from a diisocyanate compound, are included in the polymer, then each of the structural units is separated by at least one structural unit of formula (IA) or (IB).

The mole fractions of structures (IX) and (X) are 1–f(m+n) and 1–f' (m+n), respectively, wherein f and f' are each 1 except if the sum of m and n is about 0.5, then f and f' may each independently have a value greater than 1 but less than 2, and both formulas (IX) and (X) are selected as structural units in the polymer.

Each $R^1$ and each $R^2$ in the structural formulas above is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, nitro, halogen, cyano, hydroxy, or deuterated equivalents thereof. Preferably, each $R^1$ is hydrogen or deuterium, and each $R^2$ is methyl, trideuteromethyl, or trifluoromethyl.

DESCRIPTION OF THE PREFERRED EMBODIMENTS

The present invention relates to novel optically active linear polymers containing optically pure indane moieties of formulas (IA) and/or (IB) above. The chiral polymers include indane polycarbonates, polyurethanes, and polyesters. More particularly, the polymers include optically active homopolycarbonates comprising structural units (IA) or (IB) derived from the enantiomers of corresponding chiral indanols and also include optically active random copolycarbonates comprising both structural un its (IA) and (IB) in differing molar amounts. In addition, the optically active polymers include alternating linear copolycarbonates, copolyesters, and copolyurethanes in which structural units (IA) or (IB) alternate with structural units chosen from formulas (II)–(III) or (VI)–(XII). The alternating copolymers may contain both optically active units (IA) and (IB) in differing molar amounts, wherein each selected structural unit (II)–(III) or (VI)–(XII) alternates with a structural unit of (IA) or (IB), but otherwise, the placement of each (IA) and (IB) structure in the chain is completely random. Also included within the present invention are random linear copolycarbonates in which enantiomeric structural units (IA) and/or (IB) are randomly dispersed with structural units chosen from structures (II), (III), (VI), (VII), or (VIII) throughout the polymeric chain. The present polymers also include optically active indane polyester (polyarylate) polymers wherein structural units (IA-IX) and (IA-X) or (IB-IX) and (IB-X) are randomly distributed throughout the polymer. Also included within the present invention are polymers containing chiral indane polyester oligomers randomly dispersed with optically active indane polycarbonate monomers. Similarly, polymers containing chiral indane polyurethane blocks randomly dispersed in the chain with optically active indane polycarbonate monomers are disclosed.

Each $R^1$ and $R^2$ substituent of chiral indane structural moieties (IA) and (IB), of racemic moieties (II) and (III), and of the achiral moieties (VI)–(XII) is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, nitro, halogen, cyano, hydroxy, or deuterated equivalents thereof. Illustrative useful $R^1$ and $R^2$ substituents are hydrogen, alkyl such as methyl, ethyl, butyl, pentyl, octyl, nonyl, tert-butyl, neopentyl, isopropyl, sec-butyl, dodecyl, and the like; aryl such as phenyl; cycloalkyl such as cyclohexyl, cyclooctyl, cycloheptyl, cyclopentyl, and the like; alkoxyalkyl and aryloxyalkyl such as phenoxymethylene, phenoxyethylene, methoxymethylene, ethoxymethylene, methoxyethylene, butoxymethylene, propoxyethylene, and the like; arylalkyl such as phenylethyl, phenylpropyl, benzyl, and the like; and substituted alkyl and aryl groups such as cyanomethyl, 3-chloropropyl, 3,4-dichlorophenyl, 4-chloro-3-cyanophenyl, chloromethyl, dichloromethyl, trichloromethyl, fluoromethyl, difluoromethyl, trifluoromethyl, 4-nitrophenyl, phenoxyphenyl, 4-methylphenyl, 2,4-dimethylphenyl, 2-nitroethyl, nitromethyl, and the like. In addition, deuterated substituents $R^1$ and $R^2$ in which at least one hydrogen is replaced with the deuterium isotope may be employed. Each $R^1$ is preferably hydrogen or deuterium, and each $R^2$ is preferably an alkyl radical such as methyl, a halogenated alkyl radical such as trifluoromethyl, or a deuterated equivalent thereof.

Most often, the chiral indane moieties (IA) and (IB) are derived from the enantiomers of 5-hydroxy-3-(4-hydroxyphenyl)-1,1,3-tri($R^2$)indanes, wherein $R^2$ is defined above. Preferably, $R^2$ is methyl, and 5-hydroxy-3-(4-hydroxyphenyl)-1,1,3-trimethyl indane, which is also referred to herein as "IBP", is usually used as the starting material due to its ease in preparation from commercially available materials. IBP is represented by the following structure:

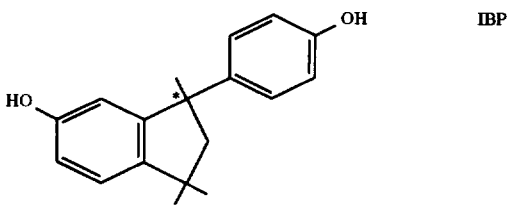

wherein the asterisk (*) represents the chiral carbon. However, it should be noted that the present invention is not limited to the use of IBP, and other substituted indane bisphenols wherein $R^1$ and $R^2$ are defined above are equally effective in producing optically active indane polymers exhibiting the advantageous properties described earlier.

The optical rotational orientations and absolute configurations associated with structural moieties (IA) and (IB) derived from the enantiomers of IBP are, respectively, (R)(+) and (S)(–). Thus, as used herein, "(R)(+)-IBP" refers to (R)(+)-5-hydroxy-3-(4-hydroxyphenyl)-1,1,3-trimethyl indane and moieties thereof, and "(S)(–)-IBP" refers to (S)(–)-5-hydroxy-3-(4-hydroxyphenyl)-1,1,3-trimethyl indane and its derivatives.

Substituted and unsubstituted racemic indane bisphenols can be prepared according to the method disclosed in U.S. Pat. No. 4,334,106 by treating iso-propenyl phenol (IPP) or a mixture of its linear oligomers with a stoichiometric excess of organic acid. IPP can be prepared by base catalyzed cracking of BPA. The disclosure of U.S. Pat. No. 4,334,106 is incorporated herein by reference. Alternatively, indane bisphenols can be prepared by reacting the corresponding indanamine with sodium nitrite in the presence of aqueous acid as described by J. C. Wilson, *Journal of Polymer Science: Polymer Chemistry* Edition 13, 749–754 (1975), which is also incorporated herein by reference. Also, see U.S. Pat. No. 2,979,534, which is also incorporated herein by reference. The indanamine can be prepared by the method described by J. C. Petropoulos and J. J. Fisher, *J. Amer. Chem. Soc.* 80, 1938 (1958) from the corresponding carboxy indane compound, which is also incorporated herein by reference.

Racemic indane bisphenol mixtures may be resolved into their individual enantiomers for use in the present invention using a lipase-catalyzed stereo- and regio-selective hydrolytic process, which is disclosed for the preparation of IBP enantiomers in the commonly assigned U.S. patent application being filed concurrently herewith and corresponding to Attorney Docket No. 0953.031, the disclosure of which is also incorporated herein by reference. Alternatively, the enantiomers may be separated using traditional separation techniques, such as fractional crystallization or HPLC using columns packed with chiral stationary phase.

The relative amounts of chiral indane structural units (IA), (IB), and of units (II)–(III) and (VI)–(XII) in the polymeric compositions may be represented as mole fractions, where the mole fraction of (IA) is given by m, the mole fraction of (IB) is given by n, and the mole fraction of structural units (II), (III), (VI), (VII), (VIII), (XI), and (XII) is each 1–(m+n). In structure (IX), the mole fraction is given by 1–f(m+n), and in structure (X), the mole fraction is represented as 1–f'(m+n), where f and f' each multiply the quantity (m+n) and are each 1 except if the sum of m and n is 0.5. Then f and f' may each be 1 or may each independently have a value greater than 1 but less than 2. When f and f' are each greater than 1, both formulas (IX) and (X) are selected as structural units contained in the polymer.

The values of m and n are each independently from 0 to about 1.0, and the sum of m and n is less than or equal to 1.0. However, the mole fractions, m and n, of chiral indane moieties (IA) and (IB) must differ. Otherwise, in polymers containing both enantiomeric moieties, the optical rotations of structural units (IA) and (IB) would be exactly equal in magnitude but opposite in direction, and the overall rotation would have a value of 0. In effect, although the polymer would comprise optically active monomeric units, (IA) and (IB), the overall optical activity would be canceled after polymerization.

Thus, the optically active indane polymers of the present invention include chiral polycarbonate homopolymers containing only structural units (IA) or (IB), wherein one of m or n is 1.0, and the other is 0. In addition, the invention includes optically active random copolycarbonates comprising structural units (IA) and (IB) randomly dispersed throughout the polymer, wherein the sum of m and n is 1.0, and m and n each have numerical values greater than 0. However, as stated above, the mole fractions of (IA) and (IB), m and n, respectively, cannot be equal in value.

The invention also includes optically active random copolycarbonates which comprise optically active indane units (IA) and/or (IB) randomly distributed in the polymer chain with structural units having formula (II), (III), (VI), (VII), or (VIII). In the random polycarbonates, the relative mole fractions of the structural units contained therein may vary widely depending on the application and the properties desired. The sum of m and n is less than 1.0, and the value of one of m or n may be 0.

As used herein, the term "random" refers to optically active polymers wherein at least two differing structural units, monomers, or oligomers are randomly dispersed or distributed along the polymeric chain backbone. An "oligomer" consists of only two, three, four, five, or six monomer units (ie. dimer, trimer, tetramer, pentamer, hexamer). A "monomer" is a low molecular weight compound capable of being polymerized with itself or other similar compounds and refers also to the corresponding structural moiety, such as to each of structures (IA), (IB), (II)–(III), or (VI)–(XII), that is contained in the polymeric chain.

Alternating chiral polycarbonates, polyurethanes, and polyesters may also be prepared, wherein units of (IA) and/or (IB) alternate in the polymer with structural units selected from (II), (III), (VI), (VII), (VIII), (IX), (X), (XI), or (XII). When one of the mole fractions, m or n, of the chiral indane moiety (IA) or (IB) is about 0.5, and the other of m and n is 0, then the resulting copolymers are referred to herein as "AB" copolymers. Similar to the AB copolymers, a second type of alternating copolymer containing both (IA) and (IB) moieties may be prepared in which each unit selected from (II)–(III) or (VI)–(XII) alternates in the chain with a unit of (IA) or a unit of (IB). Otherwise, the placement of each (IA) and (IB) unit in the chain is random. In this second type of alternating copolymer, both m and n are other than 0, but the sum of m and n is about 0.5. When either structure (IX) or (X) is included in the alternating polymers, then f or f', respectively, is 1. Thus, in the alternating copolymers, the mole fraction of the selected formula (II)–(III) or (VI)–(XII) is about 0.5.

In another embodiment, when the sum of m and n is about 0.5, both formulas (IX) and (X) may be included in the polymer. Such polyester polymers are referred to herein as "copolyarylate block polymers". As used herein, the term "block polymer" refers to a polymer made up of sections or blocks of one chemical composition and sections or blocks of a differing chemical composition. Each "block", as used herein, is a structural unit and comprises either an oligomer or a monomer.

In the copolyarylate block polymers, the mole fractions of (IX) and (X) are respectively 1–f(m+n) and 1–f' (m+n), and the values of f and f' are each independently greater than 1 but less than 2. In one embodiment, one of the mole fractions, m or n, of the chiral indane moieties (IA) and (IB) is about 0.5, and the other of m and n is 0. Alternatively, mole fractions, m and n, are both other than 0, but are not equal in value. In this case, the sum of m and n is about 0.5, and both moieties (IA) and (IB) are included in the copolyarylate block polymer.

When only chiral structure (IA) having a mole fraction of about 0.5 is included in the copolyarylate block polymer, and the mole fraction, n, of (IB) is 0, each respective structural unit of formula (IX) and (X) is connected to a structural unit of formula (IA) forming a first copolyarylate block polymer having structural units or blocks comprising oligomers (IA-IX) and (IA-X). When only chiral structure (IB) is included in the polymer, and the mole fraction, m, of (IA) is 0, each respective structural unit of formula (IX) and (X) is connected to a structural unit of formula (IB) to form a second copolyarylate block polymer having structural blocks (IB-IX) and (IB-X)

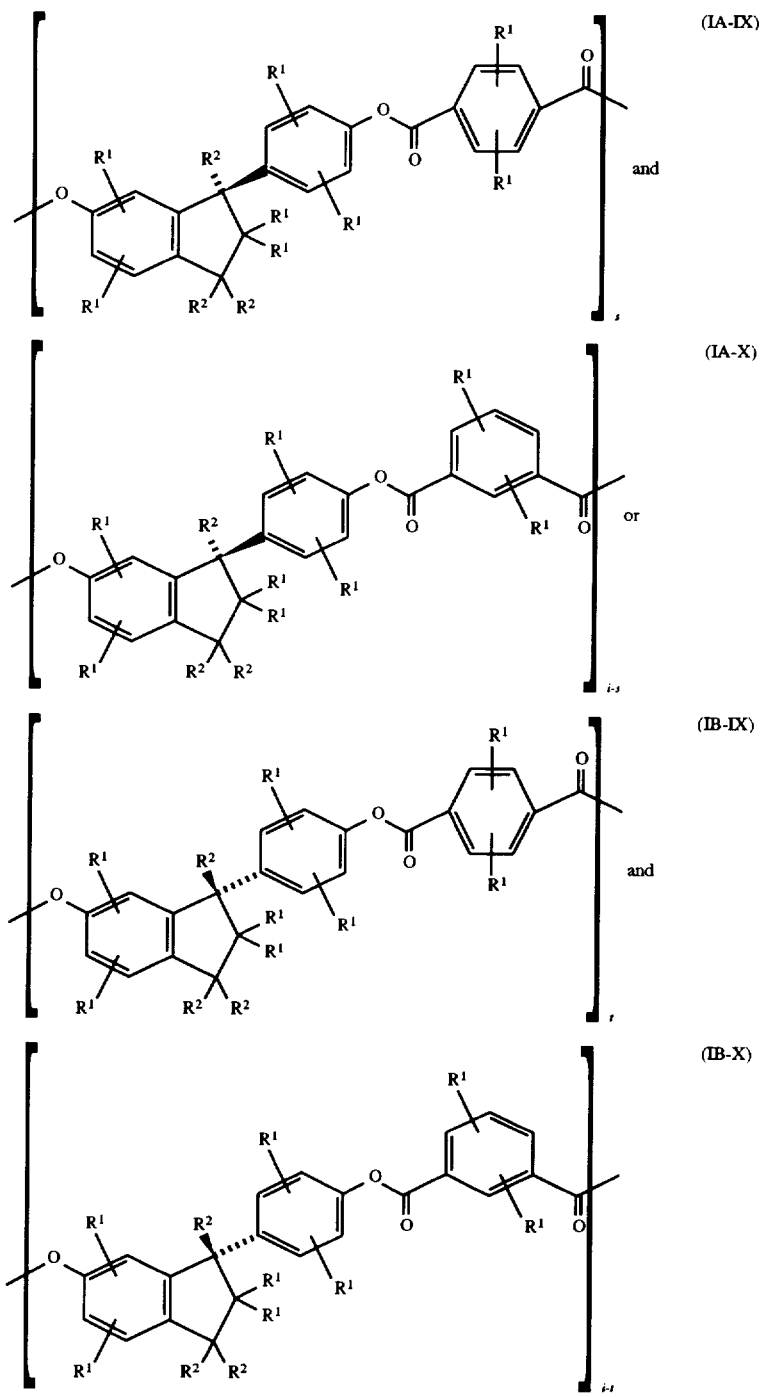

In the copolyarylate block polymers provided above, s is the mole fraction of structural oligomeric blocks (IA-IX), 1−s is the mole fraction of structural oligomeric blocks (IA-X), t is the mole fraction of structural units (IB-IX), and 1−t is the mole fraction of structural units (IB-X), and s and t each have a numerical value greater than 0 but less than 1.0. For example, f and f' may each be about 1.5, and s and t may each be about 0.5. Another example is provided when f is about 1.25, f' is about 1.75, and s and t are each about 0.75. Alternatively, f may be about 1.75, f' may be about 1.25, and s and t may each be about 0.25. However, the overall mole fraction, m or n, of the chiral indane moiety (IA) or (IB) is about 0.5. In the preferred embodiment, the structural units (IA-IX) and (IA-X) in the first copolyarylate block polymer and (IB-IX) and (IB-X) in the second copolyarylate block polymer are randomly distributed.

The present optically active indane polymers also include polycarbonate polyester block polymers and polycarbonate polyurethane block polymers. In the present polycarbonate block polymers, as shown in the structures that follow, one block comprises an optically active polyester or polyurethane oligomer, and the second block is a chiral polycarbonate monomer having structure (IA) or (IB). Briefly, structural units or blocks of (IA-IX), (IA-X), (IA-XI), or (IA-XII) are distributed, typically at random, throughout blocks of (IA) monomers, and blocks of (IB-IX), (IB-X), (IB-XI), or (IB-XII) are distributed throughout the respective (IB) monomers. The overall mole fraction of the chiral indane moieties (IA) or (IB) in the block polymers is greater than 0.5, and typically ranges from about 0.60 to about 0.90.

More specifically, in the optically active polycarbonate polyester block polymers, one of in and n is greater than about 0.5, and the other of m and n is 0. The polymers include structural units selected from formulas (IX), (X), or (XI). When formula (IX) or (X) is selected, f and f' in the corresponding mole fractions are 1. When the mole fraction of (IB), n, is 0, the selected structural unit of formula (IX), (X), or (XI) is connected to a chiral indane structure (IA) forming a first polyester oligomer having structure (IA-Z). Blocks of the first polyester oligomer and blocks of a first polycarbonate monomer comprising at least one structural unit (IA) combine to form a first polycarbonate polyester block polymer having structural blocks (IA-Z) and (IA)

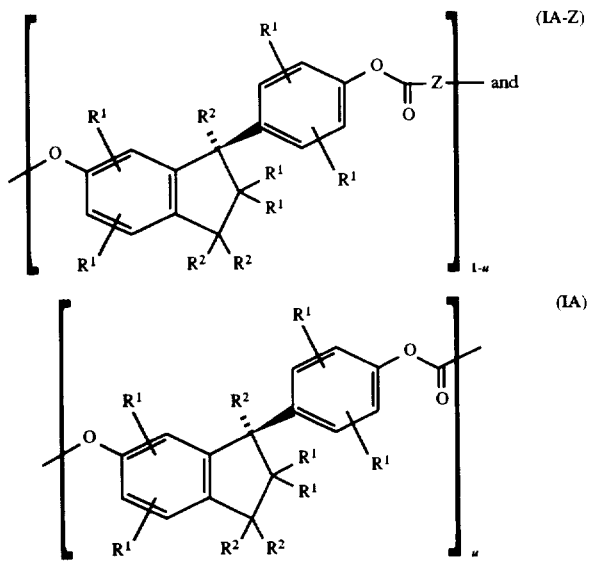

wherein Z represents the selected structural unit (IX), (X), or (XI); u is the mole fraction of the first polycarbonate monomer; and 1−u is the mole fraction of the first polyester oligomer. The value of u ranges from about 0.10 to about 0.90.

When in is 0, each selected structural unit of formula (IX), (X), or (XI) is connected to a structural unit of formula (IB) forming a second polyester oligomer having structure (IB-Z). The block polymer comprises blocks of the second polyester oligomer and blocks of a second polycarbonate monomer comprising at least one structural unit (IB). A second polycarbonate polyester block polymer is formed having structural blocks (IB-Z) and (IB)

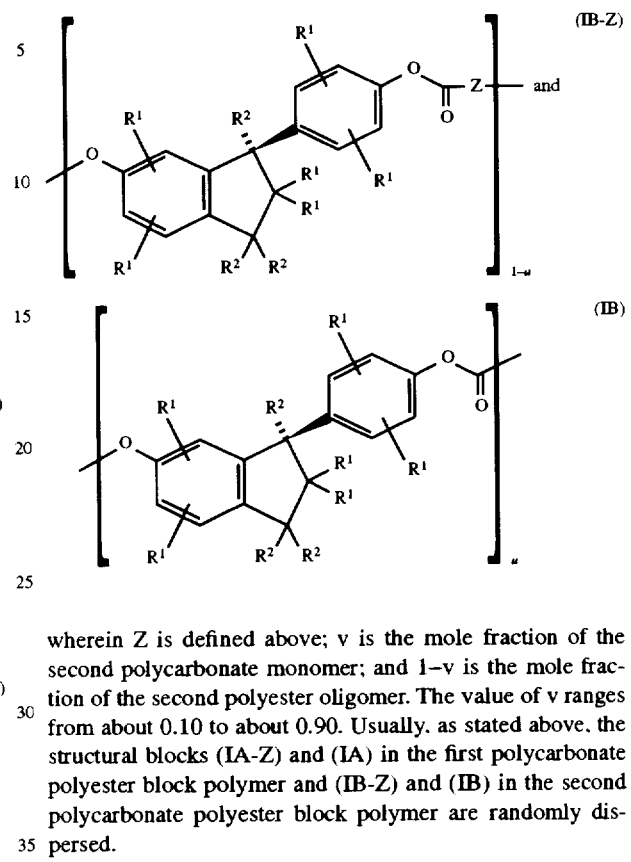

wherein Z is defined above; v is the mole fraction of the second polycarbonate monomer; and 1−v is the mole fraction of the second polyester oligomer. The value of v ranges from about 0.10 to about 0.90. Usually, as stated above, the structural blocks (IA-Z) and (IA) in the first polycarbonate polyester block polymer and (IB-Z) and (IB) in the second polycarbonate polyester block polymer are randomly dispersed.

Similarly, optically active polycarbonate polyurethane block polymers may be prepared. In these polymers, one of m and n is greater than about 0.5, the other of m and n is 0, and structural units of formula (XII) are included. When n is 0, each structural unit of formula (XII) is connected to a structural unit of formula (IA) forming a first polyurethane oligomer having structure (IA-XII). The optically active polymer comprises blocks of the first polyurethane oligomer and blocks of a first polycarbonate monomer comprising at least one structural unit (IA). A first polycarbonate polyurethane block polymer is formed containing structural blocks (IA-XII) and (IA)

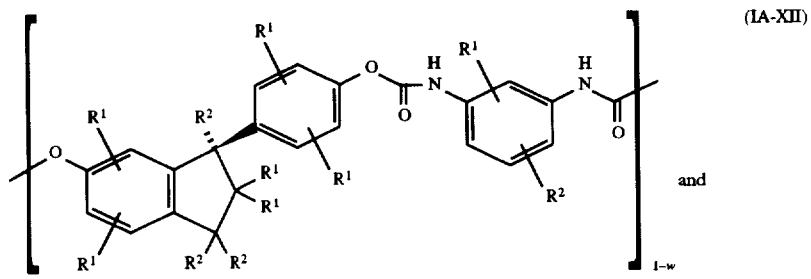

-continued

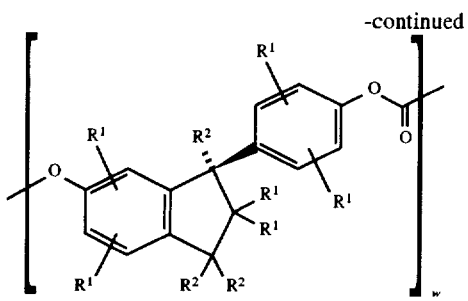

(IA)

wherein w is the mole fraction of the first polycarbonate monomer; 1−w is the mole fraction of the first polyurethane oligomer; and w has a numerical value from about 0.10 to about 0.90. Likewise, when m is 0, each structural unit of formula (XII) is connected to an optically active structural unit of formula (IB) forming a second polyurethane oligomer having structure (IB-XII). The block polymer comprises blocks of the second polyurethane oligomer and blocks of a second polycarbonate monomer comprising at least one structural unit (IB). A second polycarbonate polyurethane block polymer is formed containing structural blocks (IB-XII) and (IB)

(IA):(IB) cannot be 50:50. The molar ratios in the random copolyarylate block polymers containing units of (IA-IX) and (IA-X) or (IB-IX) and (IB-X) are represented as (IA):(IX):(X) and (IB):(IX):(X), respectively, and have values varying from about 50:1:49 to 50:49:1. The molar proportion of the chiral indane moieties (IA) or (IB) to structures (IX)–(XII) in the homopolycarbonate/polyester and homopolycarbonate/polyurethane block polymers ranges from about 60:40 to about 90:10.

The relative molar amounts of the structural moieties contained in the present optically active indane polymers can be selected for specific applications or to enhance

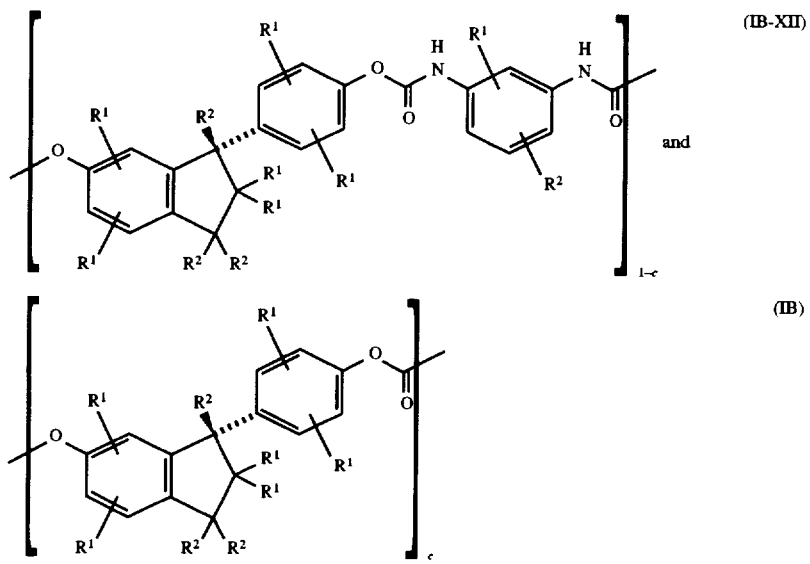

(IB-XII)

and (IB)

wherein c is the mole fraction of the second polycarbonate monomer; 1−c is the mole fraction of the second polyurethane oligomer; and c has a numerical value from about 0.10 to about 0.90. Typically, the structural blocks (IA-XII) and (IA) in the first polycarbonate polyurethane block polymer and (IB-XII) and (IB) in the second polycarbonate polyurethane block polymer are randomly distributed.

The relative molar amounts of the structural units contained in the optically active polymers may also be represented as molar ratios. Thus, in the chiral polycarbonate homopolymers, the molar ratio of structural units (IA) or (IB) to structures (II)–(III) or (VI)–(XII) is 100:0. In the alternating polycarbonates, polyesters, and polyurethanes, the molar ratio of structural units (IA) and/or (IB) to structures (II)–(III) or (VI)–(XII) is 50:50. In the optically active random polycarbonates, the molar ratio of (IA):(IB); of |(IA) and (IB)|: |(II)–(III) or (VI)–(VIII)|; or of |(IA) or (IB)|:|(II)–(III) or (VI)–(VIII)| may vary from 99:1 to 1:99. However, for the reasons provided above, the molar ratio of certain properties. For example, the optical rotations are the greatest (highest absolute value) in the polycarbonate homopolymers and decrease as the amount of chiral indane monomer (IA) or (IB) contained in the polymer decreases. Other properties may be found to vary with the relative amount of the chiral monomers contained in the polymers, and one of skill in the art would be able to optimize whichever property is desirable by adjusting the amount of chiral monomer appropriately.

The weight average molecular weight ($M_w$, kg/mole) of the optically active indane polymers of the present invention may vary widely. In general, the weight average molecular weight ranges from about 10 kg/mole to about 500 kg/mole. A high molecular weight ($\geq 10$ kg/mole) is desirable to ensure that the integrity of the material is maintained when exposed to high temperatures (>150° C.), an important property in high temperature processing and optoelectronics applications.

To restate, the optically active polymers of the present invention include a wide variety of novel homopolycarbonates, random copolycarbonates, and alternating copolycarbonates, copolyesters, and copolyurethanes containing chiral indane moieties. In addition, the invention includes optically active block polyarylate polymers, block homopolycarbonate/polyester polymers, and block homopolycarbonate/polyurethane polymers. Consideration will now be given to each of these types of optically active indane polymers with preferred parameters and illustrative methods of preparation.

Unless otherwise indicated, the remaining reactants and reagents used in the reactions described below are readily available materials. Such materials can be conveniently prepared in accordance with conventional preparatory procedures or obtained from commercial sources. Deuterated compounds for use in the preparation of deuterated optically active polymers may be prepared using deuterated reactants in the reactions below.

Use of IBP in the examples that follow are for illustrative purposes, and one of ordinary skill in the art would understand that other substituted and unsubstituted indanols may be used instead to provide the optically active polymers of the present invention. The present invention is not limited to the specific embodiments found in the examples.

Polycarbonates

The chiral polycarbonates of the present invention may be formed from the polymerization of indanol enantiomers either alone or with various bisphenols, biphenols, and benzenediols from which structural moieties (II), (III), (VI), (VII) and (VIII) are derived, as discussed below.

Alternating Polycarbonate Copolymers

Procedure 1

The optically active alternating polycarbonate copolymers of the present invention, wherein a chiral structural unit of formula (IA) or formula (IB) alternates in the polymeric chain backbone with a structural moiety selected from formulas (II), (III), (VI), (VII) or (VIII), can be conveniently prepared by a conventional condensation polymerization reaction. In this reaction, an appropriately substituted chiral indanol, such as (R)(+)-IBP or (S)(−)-IBP, or a mixture of indanol enantiomers in differing molar amounts, is combined with nearly equimolar amounts of an appropriately substituted aromatic bishaloformate compound, such as a bischloroformate having formula (XIII)

(XIII)

wherein Q is a structural moiety corresponding to one of structures (II), (III), (VI), (VII), or (VIII).

Substituted and unsubstituted bischloroformate compounds may be prepared by the reaction of corresponding aromatic dihydroxy compounds, such as bisphenols, biphenols, or benzenediols, with methylene chloride and phosgene by the method described for BPA by Brunelle et al. in *Polymer Int'l* 37, 179–186 (1995), which is also incorporated herein by reference.

Aromatic dihydroxy compounds suitable for use in the preparation of bischloroformates and in the polycarbonate polymerization reactions described below include racemic indanols from which formula (II) is derived. Racemic IBP, wherein $R^1$ is hydrogen and $R^2$ is methyl may be used. Structural monomer (III), referred to herein as a "spirobiindane" monomer or moiety is generally derived from a racemic 6,6'-dihydroxy-3,3,3',3'-tetra($R^2$) spirobiindane compound, referred to herein as a "spirobiindanol" or "spriobiindane bisphenol". Substituted and unsubstituted spirobiindane bisphenols for use in the present invent on can be prepared by reacting the appropriately substituted BPA with concentrated hydrochloric acid, as disclosed by Curtis in *J. Chem. Soc.*, 415–418 (1962), the disclosure of which is incorporated herein by reference. In addition, Baker and Besly, *J. Chem. Soc.* 1421–24 (1939), U.S. Pat. No. 2,979, 534, and Stueben, *J. Poly Sci.*, Part A, 3, 3209–17(1965), all of which are incorporated herein by reference, disclose the conversion of bisphenols, such as BPA, to the corresponding spirobiindanols using sulfuric acid, benzenesulfonic acid, or p-toluenesulfonic acid. The preparation of spirobiindanols using the aforementioned condensation reaction of BPA in the presence of sulfuric acid is also described in U.S. Pat. No. 3,271,463, which is also incorporated herein by reference. U.S. Pat. No. 4,552,949, which is incorporated herein by reference, discloses the reaction in the presence of anhydrous methanesulfonic acid or hydrochloric acid, and U.S. Pat. No. 4,605,789, which is also incorporated herein by reference, teaches the reaction in the presence of strong acid cation exchange resins.

Usually spirobiindane bischloroformate (XIII) containing formula (III) is formed from 6,6'-dihydroxy-3,3,3',3'-tetramethyl spirobiindane (SBI) due to its ease in preparation from BPA. In structural unit (III), each R is hydrogen, and each $R^2$ is methyl when SBI is the spirobiindanol. However, other substituted spirobiindane bisphenol compounds may be used in the polymerization, wherein $R^1$ and $R^2$ are defined above, and the invention is not limited to structural moieties derived from SBI.

Aromatic bischloroformates containing structural moiety (VI), wherein x is 0, are prepared from substituted or unsubstituted biphenols. When x is 1, (VI) is a derivative of a substituted or unsubstituted bisphenol wherein a bridging carbon connects the phenol moieties. Due to their commercial availability, structure (VI) is preferably derived from one of the following: 4,4'-bisphenol, wherein x is 0, and each $R^1$ is hydrogen; bisphenol A (BPA), wherein x is 1, each $R^1$ is hydrogen, and each $R^2$ is a methyl group; or 4,4'-(hexafluoroisopropylidene)diphenol, commonly known as hexafluorobisphenol A, wherein x is 1, each $R^1$ is hydrogen, and each $R^2$ is trifluoromethyl.

Benzenediols, from which bischloroformates containing structural units (VII) and (VIII) are formed, include, respectively, hydroquinone and resorcinol, wherein each $R^1$ is hydrogen. However, substituted benzenediols i ay also be used.

Typically, in the polymerization reaction, the molar amount of bischloroformate (XIII) slightly exceeds that of the chiral indanol compound(s) in order to produce chloroformate end groups that are later capped with a monophenol. Initially, in this process, the chiral indanol, such as (R)(+)- or (S)(−)-IBP, or the mixture of the indanol enantiomers, is combined in an inert atmosphere, such as in nitrogen or argon, with 4-N,N-dimethylaminopyridine (DMAP) in methylene chloride. The reaction mixture is heated, and a solution of the aromatic bischloroformate (XIII) in methylene chloride is added over a period of up to three hours. During the addition, the reaction mixture is maintained at reflux at a temperature of about 50° C., hen stirred for an additional hour. An excess of 4-cumylphenol is then added and the solution stirred for an additional hour.

The methylene chloride solution containing the optically active alternating copolycarbonate may then be washed with a 1.0M aqueous solution of hydrochloric acid, then water and brine. The resulting chiral polymer solution, in $CH_2Cl_2$ can then be dried over $MgSO_4$, followed by concentration using a rotary evaporator. The optically active polycarbonate polymer can be isolated by conventional techniques, such as pouring the solution into vigorously stirred absolute methanol. The optically active alternating copolycarbonate can then be collected by filtration followed by drying in vacuo

Procedure 2

Alternatively, the optically active alternating copolycarbonate polymers of the present invention can be prepared by combining nearly equimolar amounts of 1) an appropriately substituted chiral indane bischloroformate compound represented by formula (XIII) above, wherein Q is either structural formula (IA) or (IB), or a mixture of chiral indane bischloroformate enantiomers, wherein each enantiomer is present in a molar amount different from the other; and 2) an appropriately substituted aromatic dihydroxy compound, such as the bisphenols, biphenols, or benzenediols discussed above in connection with the preparation of bischloroformates (from which structures (II), (III), (VI), (VII), and (VIII) are derived).

Random Polycarbonates

Optically active random indane polycarbonates of the present invention, which comprise structural units (IA) and/or (IB) randomly distributed along the backbone of the polymeric chain with structural units (II), (III), (VI), (VII), or (VIII), can be conveniently prepared by modifying the polymerization method reported by D. J. Brunelle in *Macromol. Rep.* A28 (Supp. 2), 95–102 (1991), which is incorporated herein by reference. Likewise, random polycarbonates comprising monomers of (IA) and (IB) in differing molar amounts can also be prepared using the method of Brunelle.

Briefly, to produce the optically active random copolycarbonate, phosgene or a phosgene equivalent, such as o-nitrophenyl carbonate p-nitrophenyl carbonate (NPC), is added as a transesterification agent to a mixture of a chiral indanol compound, such as (R)(+)-IBP or (S)(−)-IBP; and a bisphenol, biphenol, or benzenediol compound from which structural moieties (II), (III), (VI), (VII), and (VIII) are derived (i.e. those discussed above in connection with the formation of bischloroformates), in methylene chloride. Alteratively, both enantiomers of the indanol compound may be reacted alone or in combination with the dihydroxy compounds listed above to produce random optically active copolycarbonates containing structural units (IA) and (IB), so long as the molar amounts of the two enantiomers differ.

The amount of phosgene or equivalent thereof added is equimolar to the combined molar amounts of the aromatic dihydroxy compounds contained in the mixture (i.e. chiral indane bisphenol(s) and, optionally, racemic indane bisphenol, racemic spirobiindane bisphenol, achiral bisphenol, biphenol, or benzenediol). The process is carried out in an inert atmosphere, such as nitrogen or argon. 4-N,N-Dimethylaminopyridine in toluene is then added to the mixture, while stirring, to catalyze the reaction. The solution is stirred at reflux (~50° C.) for about 5–10 hours, then the heat is removed while the solution continues stirring under ambient conditions for about 20 additional hours. The random chiral polycarbonate copolymer can be isolated by conventional techniques such as pouring the methylene chloride solution into absolute methanol while stirring vigorously, followed by filtration and drying in vacuo.

Polycarbonate Homopolymers

Similarly, the optically active indane polycarbonate homopolymers of the present invention, which comprise recurring units of structure (IA) having a mole fraction, m of 1.0, or recurring units of (IB), wherein n is 1.0, can be prepared using the above method for random copolymers. However, in he homopolymerization reaction, the bisphenol, biphenol, or benzenediol monomers corresponding to structural moieties (II), (III), (VI), (VII), and (VIII) are omitted from the reaction. During the process, an equimolar amount of phosgene or its equivalent is combined with the appropriately substituted chiral indanol corresponding to (IA) or (IB).

The following examples are illustrative.

EXAMPLE 1

Alternating Copolycarbonate

In a two-neck round bottomed flask quipped with a stirrer, a reflux condenser, and an addition funnel, chiral (S)(−)-5-hydroxy-3-(4-hydroxyphenyl)-1,1,3-trimethylindane (670.9 mg, 2.50 mmol), 4-N,N-dimethylaminopyridine (DMAP) (623.8 mg, 5.11 mmol), and 10 ml of methylene chloride is stirred under ambient conditions for 10–20 minutes. The addition funnel contains a solution of BPA bischloroformate (901.3 mg, 2.55 mmol) in 13 ml $CH_2Cl_2$. The system is sealed, purged with argon and kept under an atmosphere of argon for the remainder of the reaction. At this time the heat is turned on, and addition of the chloroformate solution is initiated. The reaction is maintained at reflux (~50° C.) while the chloroformate solution is added over three hours. The reaction is then stirred for one additional hour. 4-Cumylphenol (108.2 mg, 0.51 mmol) is added, and the solution is stirred for an additional hour.

The methylene chloride solution containing the polymer is washed with a 1.0M aqueous solution of hydrochloric acid, then water and brine. The resulting polymer solution in methylene chloride is dried over $MgSO_4$, then concentrated to approximately 20 ml on a rotary evaporator. The polymer is isolate pouring this solution into a vigorously stirred volume of absolute methanol (250 ml). The polymer is collected by filtration and dried in vacuo for 72 hours. The resulting optically active polycarbonate polymer comprises alternating structural units (IB) derived from (S)(−)-IBP and (VI) derived from BPA, wherein the mole fractions of (IB) and (VI) are each 0.50, and wherein each $R^1$ is hydrogen, each $R^2$ is methyl, and x is 1.

EXAMPLE 2

Alternating Copolycarbonate

The procedure of Example 1 is repeated substituting (R)(+)-IBP for (S)(−)-IBP. he resulting optically active copolycarbonate polymer comprises alternating structural units (IA) derived from (R)(+)-IBP and (VI) derived from BPA, wherein the mole fractions of (IA) and (VI) are each 0.50, and wherein each $R^1$ is hydrogen, each $R^2$ is methyl, and x is 1.

EXAMPLE 3

Alternating Copolycarbonate

The procedure of Example 1 is repeated except that 1.75 mmol (469.6 mg) of (S)(−)-IBP and 0.75 mmol (201.3 mg) of (R)(+)-IBP are reacted with the BPA bischloroformate. The resulting optically active polycarbonate polymer comprises alternating structural units (IA) or (IB) derived from (S)(−)-IBP and (R)(+)-IBP, respectively, and (VI) derived from BPA, wherein the mole fraction, m, of (IA) is 0.15; the mole fraction, n, of (IB) is 0.35; and the mole fraction of (VI) is 0.50; and wherein each $R^1$ is hydrogen, each $R^2$ is methyl, and x is 1.

EXAMPLE 4

Random Copolycarbonate

To produce the random copolycarbonate, BPA (514.2 mg, 2.25 mmol), chiral (S)(−)-IBP (738.1 mg, 2.75 mmol), and o-nitrophenyl carbonate (1.52 g, 5.00 mmol) are stirred together in methylene chloride (10 ml) for 10 minutes in a two-neck round bottomed flask equipped with a stirrer and a reflux condenser. 4-N,N-Dimethylaminopyridine (DMAP) (250 μl of a 0.10M solution in toluene) is added, and the solution is clarified. The solution is stirred at reflux (~50° C.) for 5 hours. The heat is then removed, and the solution continues stirring under ambient conditions for 20 hours longer.

The polymer is isolated by pouring the methylene chloride solution into a vigorously stirred volume of absolute methanol (250 ml). The precipitated polymer is collected on a Büchner funnel. To remove any last traces of o-nitrophenol by-product from the polymer, a chloroform solution containing he polymer is prepared, and the polymer is precipitated from absolute methanol twice more. The polymer is collected by filtration and dried in vacuo for 72 hours. The optically active copolycarbonate polymer comprises structural units (IB) derived from (S)(−)-IBP which are randomly dispersed in the polymeric chain with units (VI) derived from BPA, wherein each $R^1$ is hydrogen, each $R^2$ is methyl, and x is 1. The mole fraction, n, of structural units (IB) is 0.50, and that of structural units (VI), 1−(m+n), is also 0.50. Thus, the molar proportion, (IB):(VI) (also represented as (S)(−)-IBP:BPA), is 5:50.

EXAMPLE 5

Random Copolycarbonate

The procedure of Example 4 is repeated except that 1.75 mmol (469.6 mg) of (S)(−)-IBP and 0.75 mmol (201.3 mg) of (R)(+)-IBP are reacted with the BPA. The optically active copolycarbonate polymer comprises structural units (IB), derived from (S)(−)-IBP, and (IA), derived from (R)(+)-IBP, each unit being randomly dispersed in the polymeric chain with units (VI) derived from BPA. Each $R^1$ is hydrogen, and each $R^2$ is methyl. The mole fraction, m, of structural units (IA) is 0.15; the mole fraction, n, of (IB) is 0.35; and that of structural units (VI), 1−(m+n), is 0.50.

EXAMPLE 6

Random Copolycarbonate

The procedure of Example 4 is repeated substituting an equimolar amount of 6,6'-dihydroxy-3,3,3',3'-tetramethyl spirobiindane (SBI) (771.2 mg, 2.50 mmol) for BPA. The optically active copolycarbonate polymer comprises structural units (IB) derived from (S)(−)-IBP, which are randomly dispersed in the polymeric chain with SBI units (III), wherein each $R^1$ is hydrogen, and each $R^2$ is methyl. The mole fraction, n, of structural units (IB) is 0.50, and that of structural units (III), 1−(m+n), is also 0.50.

EXAMPLES 7-13

Random Copolycarbonates

The procedure of Example 4 is repeated except that the proportions of BPA and (S)(−)-IBP are varied to produce several random optically active copolycarbonates containing structural units IB and VI, wherein each $R^1$ is hydrogen, each $R^2$ is methyl, and x is 1. Compositions having the following molar proportions (IA:VI) are prepared: 5:95; 25:75; 50:50; 60:40; 65:35; 75:25; and 80:20.

EXAMPLE 14

Random Polycarbonate

The procedure of Example 4 is repeated substituting (S)(−)-IBP (1006.4 mg, 3.75 mmol) and (R)(+)-IBP (335.5 mg, 1.25 mmol) for the BPA and (S)(−)-IBP. The optically active copolycarbonate polymer comprises structural units (IB) derived from (S)(−)-IBP which are randomly dispersed in the polymeric chain with units (IA) derived from (R)(+)-IBP, wherein each $R^1$ is hydrogen, and each $R^2$ is methyl. The mole fraction, m, of structural units (IA) is 0.25, and that of structural units (IB), n, is 0.75. Thus, the molar proportion of (S)(−)-IBP to (R)(+)-IBP is 75:25.

EXAMPLE 15

Homopolycarbonate

The procedure of Example 4 is followed except that no BPA is added to the reaction process. (S)(−)-IBP (1.61 g, 6.0 mmol) and o-nitrophenylcarbonate (1.827 g, 6.01 mmol) in 25 ml methylene chloride are stirred under an argon atmosphere. A solution of 4-N,N-dimethylaminopyridine (DMAP) in toluene (500 μl of a 0.10M solution) is added, and heat is applied to the flask. The reaction mixture is stirred at reflux (~55° C.) for 6.5 hours, after which it is stirred at ambient temperature for an additional 17 hours.

The polymer is isolated by precipitating the methylene chloride solution into 100 ml of methanol followed by filtering to recover the polymer. It is precipitated two more times from chloroform into methanol, collected, and dried in vacuo to yield the desired chiral (S)(−)-IBP polycarbonate homopolymer comprising structural units (IB) derived from (S)(−)-IBP, wherein each $R^1$ is hydrogen, and each $R^2$ is methyl. The mole fraction, n, of structural units (IB) is 1.0.

Polyurethanes

Optically active indane polyurethane polymers, wherein a chiral structural unit of formula (IA) or (IB) alternates with a structural unit of formula (XII) may be prepared using a conventional condensation polymerization process in which a diisocyanate compound shown as (XIV)

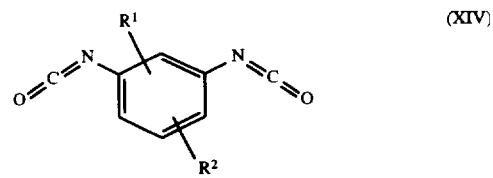

is combined with an equimolar amount of an appropriately substituted chiral indanol, such as (R)(+)-IBP or (S)(−)-IBP, or with an equimolar amount of a mixture of indanol enantiomers, wherein the number of moles of each enantiomer in the mixture differs. Typically, $R^2$ is methyl, and $R^1$ is hydrogen in both the indanol and diisocyanate compounds. An exemplary diisocyanate compound is toluene-2,4-diisocyanate or 2,4-diisocyanato-1-methyl benzene, which is commercially available from Aldrich as tolylene 2,4-diisocyanate. The resulting chiral polyurethane polymer includes structural units (XII), wherein $R^2$ is methyl and is located on the carbon at position 4 of the phenylene ring. Amide groups are located at the 1 and 3 carbons, and the remaining positions contain hydrogen. Another example uses toluene-2,6-diisocyanate or 2,6-diisocyanato-1-methyl benzene, which is commercially available from Aldrich as tolylene 2,6-diisocyanate, resulting in a polyurethane wherein a methyl group is located on the carbon at the 2 position of the phenylene ring of structure (XII); the amide groups are located at carbons 1 and 3; and the remaining carbons are bonded to hydrogen. However, other substituted and unsubstituted isocyanate compounds may be used, as will be evident to those of skill.

Typically, the polymerization reaction is conducted in a high boiling polar aprotic solvent such as dimethyl sulfoxide (DMSO) or tetrahydrofuran (THF). When THF is the solvent, triethylamine may be added to the mixture while stirring to catalyze the reaction. Process temperatures are not critical and can vary widely. The polymerization reactions may be conducted at room temperature, between about 20°–25° C., or alternatively, at elevated temperatures up to about 120° C.

The processes are carried out in an inert atmosphere, such as in argon or nitrogen, over a period of time sufficient to produce the desired polymer in adequate yield. Reaction times can vary between about 40 minutes and 7 days and are influenced by the reactants, reactant temperature, the concentration of the reactants (and catalyst if present), the choice of solvent, and other factors known to those of skill in the art.

The chiral indane polyurethane copolymer can be isolated by conventional techniques such as pouring the polymer solution into methanol while stirring, followed by filtration and drying in vacuo.

The following examples are illustrative.

EXAMPLE 16

In a flask equipped with a stirrer, a condenser and a nitrogen inlet, a solution of tolylene-2,4-diisocyanate (1.74 g, 0.010 mol) in 5 ml methyl isobutyl ketone is provided. A solution of (S)(−)-IBP (2.68 g, 0.010 mol) in 5 ml methyl sulfoxide (DMSO) is then added to the flask. The flask is heated to 115° C. and stirred for 2 h. The solution is then stirred for 7 days at room temperature. The chiral polymer is isolated by pouring the solution into 100 ml of vigorously stirred methanol. The powder is collected on a Büchner funnel and dried under vacuum at 50° C. for 18 hours. The resulting optically active polyurethane polymer comprises alternating structural units (IB) derived from (S)(−)-IBP wherein each $R^1$ is hydrogen, and each $R^2$ is methyl, and structural units (XII), wherein $R^2$ at position 4 is methyl, and $R^1$ is hydrogen. The mole fractions of (IB) and (XII) are each 0.50.

EXAMPLE 17

A dry, 50 ml 2-neck round bottomed flask equipped with a stirrer, a condenser, and a nitrogen inlet is charged with (R)(+)-IBP (1.34 g, 5.00 mmol), 5 ml anhydrous tetrahydrofuran (THF) and a catalytic quantity of triethylamine (50 μl, 0.36 mmol). Tolylene 2,4-diisocyanate (719 μl, 5.01 mmol) is added all at once. The solution is stirred under a nitrogen atmosphere at 25° C. for 40 minutes. The chiral polymer is poured into 100 ml of vigorously stirred methanol. The solid is collected by vacuum filtration and dried in vacuo at 50° C. for 18 h. The resulting optically active polyurethane polymer comprises alternating structural units (IA), derived from (R)(+)-IBP, and structural units (XII), wherein the mole fractions of (IA) and (XII) are each 0.50, and wherein each $R^1$ is hydrogen, and each $R^2$ is methyl. The methyl group of structural units (XII) is located at the 4 position of the phenylene ring, and the amide groups are located at the 1 and 3 positions.

Polyesters

The optically active indane polyester polymers in which a chiral structural unit of formula (IA) or (IB) alternates with a structural unit of formula (IX), (X), or (XI) may be prepared by conventional condensation polymerization reactions. One process combines an appropriately substituted diacid halide, such as a diacid chloride having formula (XV)

wherein Z is structural moiety (IX), (X), or (XI), with an equimolar amount of an appropriately substituted chiral indanol, such as (R)(+)-IBP or (S)(−)-IBP, or with an equimolar amount of a mixture of indanol enantiomers, wherein the number of moles of each enantiomer in the mixture differs. The reaction is conducted at room temperature in a nonreactive solvent, such as methylene chloride, with the addition of an acylation catalyst, such as dimethylaminopyridine (DMAP).

Alternatively, an interfacial method for polymerizing the chiral polyesters may be employed. Using this method, an appropriately substituted diacid halide in a nonreactive solvent, such as anhydrous ether or methylene chloride, is added at room temperature to a mixture of the chiral indanol enantiomer(s), sodium hydroxide, and sodium lauryl sulfate in water.

Diacid halides useful in the polymerization may be substituted or unsubstituted and include teraphthaloyl chloride and isophthaloyl chloride from which formulas (IX) and (X) are derived, respectively. The resulting structural moieties are para- or meta-linked with the moieties of structural units (IA) and/or (IB) forming optically active polyesters (polyarylates). In addition, alkyl dicarboxylic acid halides containing up to 20 carbon atoms, but most often containing 4–8 carbon atoms, may be used to produce an optically active alkyl polyester polymer having structural units (XI), wherein y is the number of carbons in the alkyl group. For example, adipoyl chloride, succinyl chloride, glutaryl dichloride, or pimeloyl chloride may be used.

In addition, by adding equal amounts of substituted or unsubstituted teraphthaloyl chloride and isophthaloyl chloride to a molar amount of chiral indanol equal to the sum of the diacid chlorides, an optically active copolyarylate block polymer may be formed in which blocks comprising structure (IA) or (IB) connected with structure (IX) are randomly distributed in the polymeric chain with blocks comprising the same selected enantiomeric moiety (IA) or (IB) connected with structure (X). The mole fraction of the (IA) or (IB) moiety is about 0.50, and the mole fraction of each of (IX) and (X) is about 0.25. Similarly, by varying the relative amounts of each acid chloride added to the reaction, copolymers having other percentages of structures (IX) and (X) may also be formed. Also, optically active copolyarylate block polymers containing structural moeities (IA), (IB), (IX) and (X), wherein each chiral moiety is connected to a structure (IX) or (X) and the resulting blocks randomly distributed in the polymeric chain, can be prepared by adding the aforementioned acid chlorides to an equimolar mixture of indanol enantiomers, provided that the molar amount of each enantiomer in the mixture differs. In these block polymers, the sum of the mole fractions of formulas (IA) and (IB) is about 0.5.

The polymerization processes are carried out in an inert atmosphere, such as in argon or nitrogen, over a period of time sufficient to produce the desired polymer in adequate yield. Reaction times can vary between about 5 minutes and 4 hours depending on the reactants, the concentration of the reactants (and catalyst if present), the choice of solvent, and other factors known to those of skill in the art. The optically active polyester polymers can be isolated by conventional techniques such as precipitation in methanol, followed by filtration and drying in vacuo.

The following examples are illustrative.

EXAMPLE 18

In a two-neck round bottomed flask equipped with a nitrogen inlet, stirrer, a reflux condenser, and an addition

23 funnel filled with a solution of isophthaloyl chloride (IP-Cl, 2.06 g, 0.010 mol) in 25 ml methylene chloride, chiral (R)(+)-IBP (2.68 g, 0.010 mol) and dimethylaminopyridine (DMAP)(2.57 g, 0.021 mol) in 42 ml methylene chloride are stirred for 10 min. The solution of acid chloride is added over 60 min. After the monomer addition is complete, the reaction is stirred an additional 3 h at room temperature. The polymer is isolated by precipitation in 300 ml acetone, followed by collection of the solid by filtration. The solid is taken up in 40 ml chloroform and precipitated a second time in 300 ml absolute methanol. The solid is dried in vacuo for 18 h at 60° C. The resulting optically active polyarylate polymer comprises alternating structural units (IA) derived from (R)(+)-IBP, wherein each $R^2$ is methyl and each $R^1$ is hydrogen, and structural units (X), wherein each $R^1$ is hydrogen, and f is 1. The mole fraction, m, of structural units (IA) is 0.50, and the mole fraction of (X) is 0.50.

EXAMPLE 19

The procedure of Example 18 is repeated substituting terephthaloyl chloride for isophthaloyl chloride. The resulting polyarylate polymer comprises alternating structural units (IA) derived from (R)(+)-IBP, wherein each $R^2$ is methyl and each $R^1$ is hydrogen, and structural units (IX), wherein each $R^1$ is hydrogen, and f is 1. The mole fraction, m, of structural units (IA) is 0.50, and the mole fraction of (IX) is 0.50.

EXAMPLE 20

The procedure of Example 18 is repeated substituting for the solution of isophthaloyl chloride a solution containing both isophthaloyl chloride and terephthaloyl chloride in equimolar amounts (1.03 g, 5 mmol of each acid chloride) in 25 ml methylene chloride. The resulting polyarylate polymer comprises structural units |(IA)-(X)| randomly dispersed in the polymeric chain with units |(IA)-(IX)|$_{0.50}$, wherein each of the units has a mole fraction of 0.50. Structure (IA) is derived from (R)(+)-IBP, wherein each $R^2$ is methyl, each $R^1$ is hydrogen. Each structure of formula (IX), wherein each $R^1$ is hydrogen, and f is 1.5, is directly connected to a structure (IA) to form unit |(IA)-(IX)|. Likewise, each structure of formula (X), wherein each $R^1$ is hydrogen, and f is 1.5, is directly connected to a structure (IA) to form unit |(IA)-(X)|. The mole fraction of each moiety (IX) and (X) is 0.25, and the mole fraction, m, of structural moiety (IA) is 0.50.

EXAMPLE 21

The procedure of Example 18 is repeated substituting for the solution of isophthaloyl chloride a solution containing isophthaloyl chloride (1.54 g, 7.5 mmol) and terephthaloyl chloride (0.515 g, 2.5 mmol) in 25 ml methylene chloride. The resulting polyarylate polymer comprises structural units |(IA)-(X)|$_{0.75}$, having a mole fraction of 0.75, which are randomly dispersed in the polymeric chain with units |(IA)-(IX)|$_{0.25}$ having a mole fraction of 0.25. Structure (IA) is derived from (R)(+)-IBP, wherein each $R^2$ is methyl, and each $R^1$ is hydrogen. Each structure of formula (IX), wherein each $R^1$ is hydrogen, and f is 1.25, is directly connected to a structure (IA) to form unit |(IA)-(IX)|. Likewise, each structure of formula (X), wherein each $R^1$ is hydrogen, and f is 1.75, is directly connected to a structure (IA) to form unit |(IA)-(X)|. The mole fraction of moiety (IX) is 0.375, and that of (X) is 0.125. The mole fraction, m, of structural moiety (IA) is 0.50.

EXAMPLE 22

Chiral (R) (+)-IBP (2.68 g, 0.010 mol) is stirred in a blender with sodium hydroxide (0.020 mol) and 1–3 mol %

24 sodium lauryl sulfate in 62 ml water in a nitrogen atmosphere. A solution of isophthaloyl chloride (2.03 g, 0.010 mol) in 30 ml of a nonreactive solvent, such as anhydrous ether or methylene chloride, is added and the mixture is stirred in a blender at low speed for 5 to 10 min. The polymer solution is precipitated in methanol, and the solid is then dried in vacuo for 18 h at 60° C. The resulting optically active polyarylate polymer comprises alternating structural units (IA) derived from (R)(+)-IBP, wherein each $R^2$ is methyl and each $R^1$ is hydrogen, and structural units (X), wherein each $R^1$ is hydrogen, and f is 1. The mole fraction, m, of structural units (IA) is 0.50, and the mole fraction of (X) is 0.50.

Polycarbonate Polyurethane Block Polymers and Polycarbonate Polyester Block Polymers Optically active block copolymers containing indane chiral homopolycarbonate monomers and indane chiral polyurethane or polyester oligomers are also contemplated by the present invention. These block-type polymers can be conveniently prepared by combining the processes described above for the synthesis of chiral indane homopolycarbonates and for the synthesis of chiral indane polyurethanes or polyesters. In this embodiment, the mole fraction of the structural moiety (IA) or (IB) is greater than 0.50, and the mole fraction of structural moiety (IX), (X), (XI), or (XII) is less than 0.50. Alternatively, in another embodiment, block polymers may be formed by chain extending chiral polycarbonate oligomers formed by the processes described above, with polyurethane or polyester monomers.

In either embodiment, hydroxy-terminated linear chiral polycarbonate monomers or oligomers replace some or all of the chiral indanol in the reactions described above for the preparation of chiral indane polyurethanes or polyesters. The hydroxy-terminated polycarbonate oligomers can be prepared by varying the process outlined above for the synthesis of alternating chiral polycarbonate polymers. An excess of indane bisphenol is used instead of an excess of bishaloformate. Thus, instead of end-capping the polycarbonate with a monophenol from 4-cumylphenol, the polymer is end-capped with a bisphenol. Alternatively, in the processes described above for producing chiral homopolycarbonates and chiral random copolycarbonates, an excess of the chiral indane bisphenol may be used.

The following examples are illustrative.

EXAMPLE 23

A round bottomed flask fitted with a condenser, addition funnel, nitrogen inlet, and stirrer is charged with (R)(+)-IBP (2.68 g, 0.010 mol), dimethylaminopyridine (2.50 g, 0.020 mol), and 35 ml of dry methylene chloride. A solution of the bischloroformate of (R)(+)-IBP (1.97 g, 0.005 mol) and terephthaloyl chloride (1.01 g, 0.005 mol) in 30 ml dry methylene chloride is slowly added. After the addition is complete, the reaction is heated and stirred at reflux for 1 hour. The polymer solution is precipitated in 300 ml methanol. The solid is collected in a Büchner funnel and dried in vacuo. The resulting optically active polycarbonate polyarylate polymer comprises moieties (IA), derived from (R)(+)-IBP, and (IX), wherein each $R^1$ is hydrogen, and each $R^2$ is methyl. The mole fraction of randomly dispersed structural blocks (IA-IX) is 0.50, and the mole fraction of random structural blocks (IA) is 0.50. The mole fraction, m, of (IA) is 0.75 and the mole fraction of (IX) is 0.25.

EXAMPLE 24

The procedure of Example 1 is repeated except that the molar ratio of (S)(−)-IBP to BPA-bischloroformate is changed. A flask is charged with (S)(−)-IBP (1.34 g, 5.00 mmol), DMAP (1.10 g, 9.00 mmol), and 20 ml (CH$_2$Cl$_2$. The reaction mixture is stirred under nitrogen for 20 minutes. A solution of BPA-bischloroformate (1.413 g, 4.00 mmol) in 20 ml CH$_2$Cl$_2$ is added over 5 minutes, and the reaction stirred at reflux for 2 hours. The chiral oligomers having structural blocks (IB-VI) are isolated by precipitation into methanol.

In a second step, the procedure of Example 17 is followed, except that the hydroxy-terminated chiral oligomers from the first step above are used in place of the chiral diol monomer ((R)(+)-IBP). The solid is collected in a Büchner funnel and dried in vacuo. The resulting optically active polycarbonate polyurethane polymer comprises structural blocks (IB-VI), which alternate in the polymeric chain with structural moieties (XII). Each R$^1$ is hydrogen, and each R$^2$ is methyl. The mole fraction of structural blocks (IB-VI) is 0.50, and the mole fraction of each (IB) and (VI) is 0.25. The mole fraction of alternating units (XII) is 0.50.

The optically active indane polymers of the present invention are of high molecular weight making them useful in high temperature processing applications. In addition, the polymers have high optical rotations making them useful in optoelectronics applications where achiral polymers cannot be used. Thus, unlike known polycarbonates, polyesters, and polyurethanes, the present optically active indane polymers have utility in the fabrication of chiral waveguides and can be used as polarizing coatings, lenses, and/or filters.

While the invention has been particularly shown and described with reference to the preferred embodiments thereof, it will be understood by those skilled in the art that other changes in form and details may be made therein without departing from the spirit and scope of the invention.

We claim:

1. An optically active linear polymer comprising (a) structural units having formula (IA) and formula (IB)

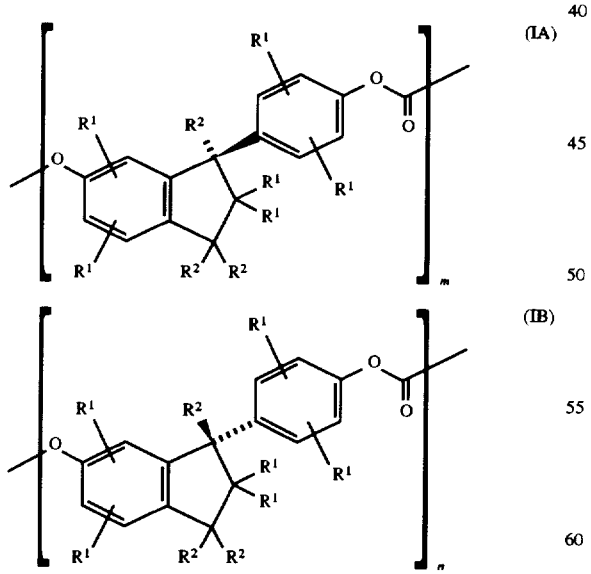

and (b) structural units selected from the group having formula (II), formula (III), formula (VI), formula (VII), formula (VIII), formula (IX), formula (X), formula (XI), or formula (XII)

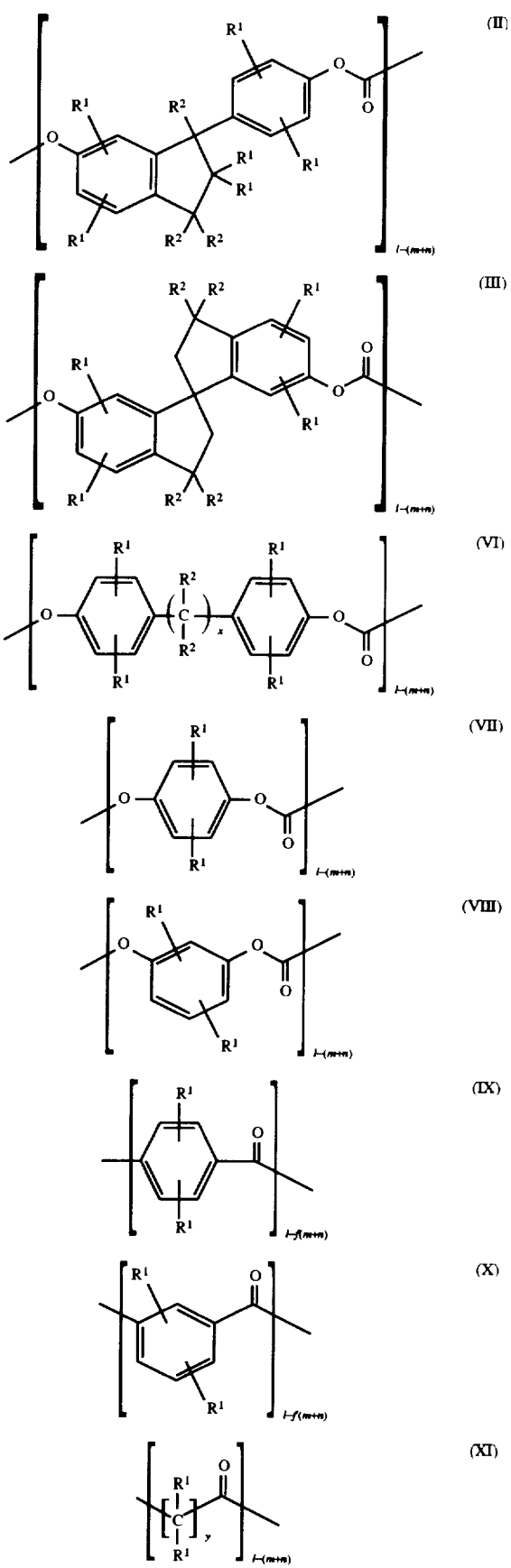

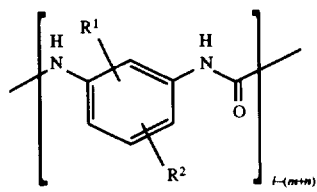

wherein m is the mole fraction of said structural units (IA) in said polymer, and n is the mole fraction of said structural units (IB) in said polymer, m and n each independently having a numerical value from 0 to 1.0, wherein the numerical value of m differs from the numerical value of n, and wherein the sum of m and n is less than or equal to 1.0;

wherein x is 0 or 1; y is 1 to 20;

wherein f and f' are each 1 except if the sum of m and n is about 0.5, then f and f' may each independently have a value greater than 1 but less than 2, and both formulas (IX) and (X) are selected as structural units of part (b);

wherein when said structural units of part (b) have formula (IX), (X), (XI), or (XII), then each said structural unit of part (b) is separated by at least one structural unit of part (a); and wherein each $R^1$ and each $R^2$ is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, nitro, halogen, cyano, hydroxy, or deuterated equivalents thereof.

2. The polymer of claim 1, wherein m or n is 1.0, said polymer comprising structural units of formula (IA) or (IB), respectively.

3. The polymer of claim 1, wherein the sum of m and n is 1.0, m and n each have numerical values greater than 0, and said structural units (IA) and (IB) are randomly distributed in said polymer.

4. The polymer of claim 1, wherein the sum of m and n is less than 1.0, said selected structural units of part (b) have formula (II), (III), (VI), (VII), or (VIII), and said selected strucutural units of parts (a) and (b) are randomly distributed in said polymer.

5. The polymer of claim 4, wherein m or n is 0.

6. The polymer of claim 1, wherein one of m and n is about 0.5, the other of in and n is 0, said structural units of part (b) are selected from formulas (II)–(III) and (VI)–(XII), and f and f' are 1 when said selected formula of part (b) is formula (IX) or (X), respectively.

7. The polymer of claim 6, wherein each said structural unit of part (a) having a mole fraction of about 0.5 and each said selected structural unit of part (b) alternate.

8. The polymer of claim 1, wherein m and n are each other than 0, the sum of m and n is about 0.5, said structural units of part (b) are selected from formulas (II)–(III) and (VI)–(XII), and f and f' are 1 when said selected formula of part (b) is formula (IX) or (X), respectively.

9. The polymer of claim 8, wherein each said selected structural unit of part (b) alternates with a structural unit of formula (IA) or formula (IB).

10. The polymer of claim 1, wherein one of m and n is about 0.5, the other of m and n is 0, and f and f' each independently have a value greater than 1 but less than 2, wherein said selected structural units of part (b) comprise formulas (IX) and (X), and wherein each respective structural unit of formula (IX) and (X) is connected to a structural unit of formula (IA) when n is 0 to form to form a first copolyarylate block polymer having structural blocks (IA-IX) and (IA-X) or to a structural unit of formula (IB) when m is 0 to form a second copolyarylate block polymer having structural blocks

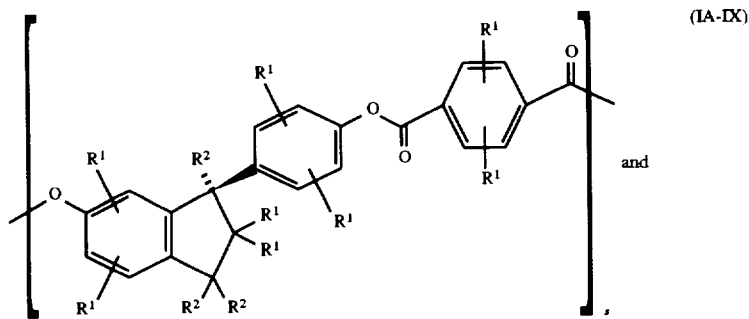

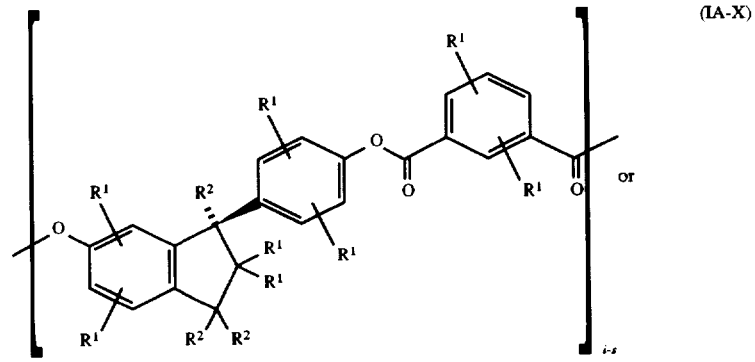

-continued

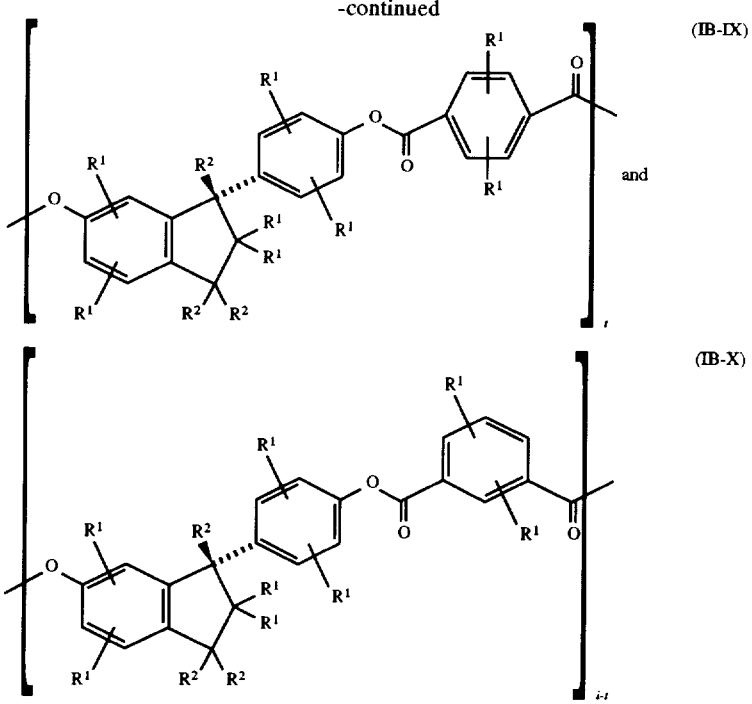

wherein s is the mole fraction of said structural blocks (IA-IX), 1-s is the mole fraction of said structural blocks (IA-X), t is the mole fraction of said structural blocks (IB-IX), and 1-t is the mole fraction of said structural blocks (IB-X), wherein s and t each have a numerical value greater than 0 but less than 1.0.

11. The polymer of claim 10, wherein f and f' are each about 1.5, and s and t are each about 0.50.

12. The polymer of claim 10, wherein one of f and f' is about 1.25 and the other of and f' is about 1.75; s and t are each about 0.75 when f is about 1.25 and f' is about 1.75; and s and t are each about 0.25 when f is about 1.75 and f' is about 1.25.

13. The polymer of claim 10, wherein said structural blocks (IA-IX) and (IA-X) II said first copolyarylate block polymer are randomly distributed, and said structural blocks (IB-IX) and (IB-X) in said second copolyarylate block polymer are randomly distributed.

14. The polymer of claim 1, wherein in and n are each other than 0, the sum of m and n is about 0.5 and f and f' each independently have a value greater than 1 but less than 2, wherein said selected structural units of part (1)) comprise formulas (IX) and (X), and wherein each respective structural unit of formula (IX) and (X) is connected to a structural unit of formula (IA) or (IB).

15. The polymer of claim 1, wherein one of m and n is greater than about 0.5, the other of m and n is 0, f and f' are 1, and said selected structural units of part (b) have formula (IX), (X), or (XI), wherein when n is 0, each selected structural unit of formula (IX), (X), or (XI) is connected to a structural unit of formula (IA) forming a first polyester oligomer having structure (IA-Z), wherein said polymer comprises blocks of said first polyester oligomer and further comprises blocks of a first polycarbonate monomer comprising at least one structural unit (IA), wherein a first polycarbonate polyester block polymer is formed having structural blocks (IA-Z) and (IA)

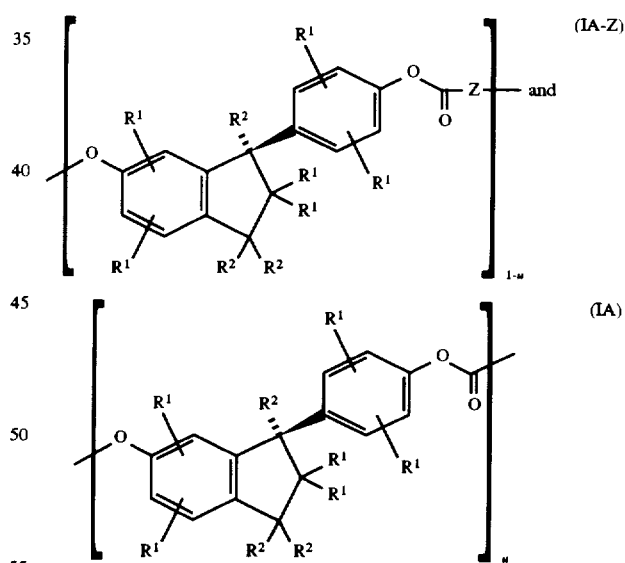

and wherein when m is 0 each selected structural unit of formula (IX), (X), or (XI) is connected to a structural unit of formula (IB) forming a second polyester oligomer having structure (IB-Z), wherein said polymer comprises blocks of said second polyester oligomer and further comprises blocks of a second polycarbonate monomer comprising at least one structural unit (IB), wherein a second polycarbonate polyester block polymer is formed having structural blocks (IB-Z) and (IB)

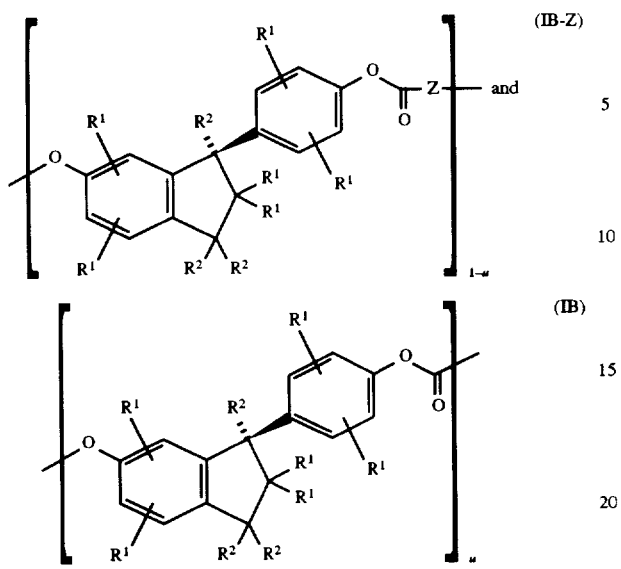

(IB-Z)

(IB)

wherein Z is selected structural unit (IX), (X), or (XI), u is the mole fraction of said first polycarbonate monomer, 1−u oligomer and further comprises blocks of a first polycarbonate monomer comprising at least one structural unit (IA), wherein a first polycarbonate polyurethane block polymer is formed having structural blocks (IA-XII) and (IA)

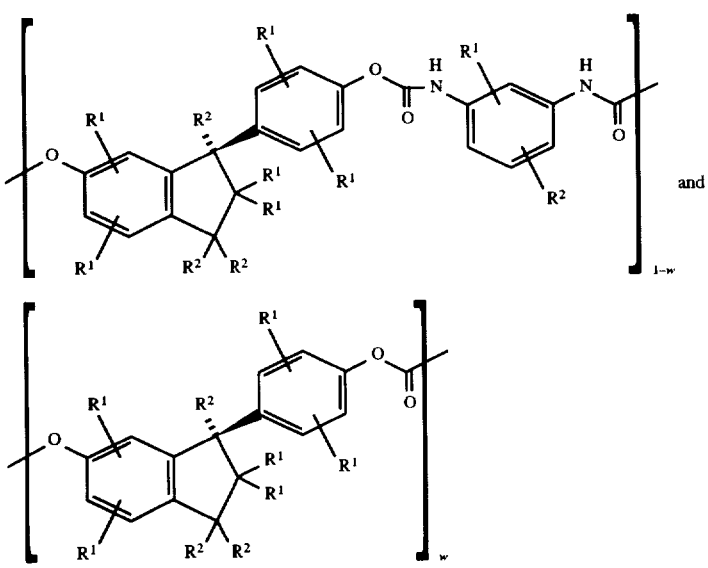

(IA-XII)

(IA)

is the mole fraction of said first polyester oligomer, v is the mole fraction of said second polycarbonate monomer, 1−v is the mole fraction of said second polyester oligomer, wherein u and v each have a numerical value from about 0.10 to about 0.90.

16. The polymer of claim 15, wherein said structural blocks (IA-Z) and (IA) in said first polycarbonate polyester block polymer are randomly distributed, and said structural blocks (IB-Z) and (IB) in said second polycarbonate polyester block polymer are randomly distributed.

17. The polymer of claim 1, wherein one of m and n is greater than about 0.5, the other of m and n is 0, and said selected structural units of part (b) have formula (XII), wherein when n is 0, each structural unit of formula (XII) is connected to a structural unit of formula (IA) forming a first polyurethane oligomer having structure (IA-XII), wherein said polymer comprises blocks of said first polyurethane oligomer and further comprises blocks of a first polycarbonate monomer comprising at least one structural unit (IA), wherein a first polycarbonate polyurethane block polymer is formed having structural blocks (IA-XII) and (IA) and wherein when m is 0, each structural unit of formula (XII) is connected to a structural unit of formula (IB) forming a second polyurethane oligomer having structure (IB-XII), wherein said polymer comprises blocks of said second polyurethane oligomer and further comprises blocks of a second polycarbonate monomer comprising at least one structural unit (IB), wherein a second polycarbonate polyurethane block polymer is formed having structural blocks (IB-XII) and (IB)

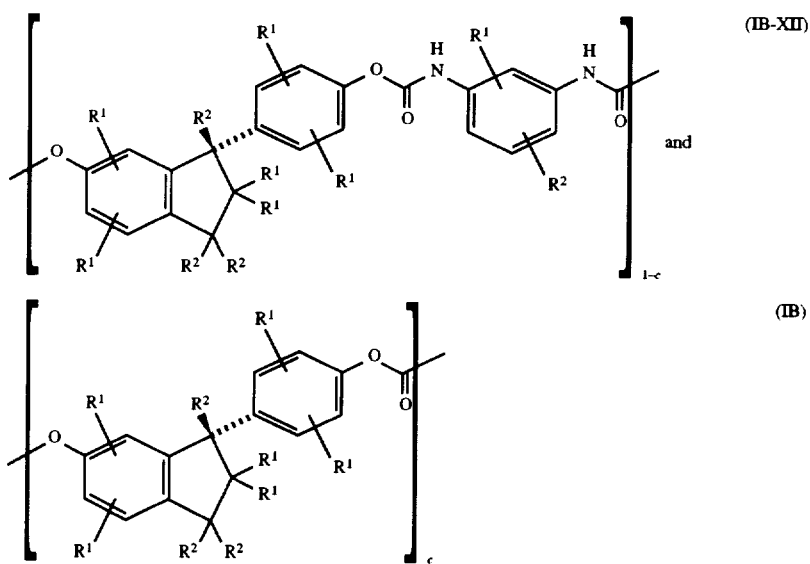

wherein w is the mole fraction of said first polycarbonate monomer, 1−w is the mole fraction of said first polyurethane oligomer, c is the mole fraction of said second polycarbonate monomer, 1−c is the mole fraction of said second polyurethane oligomer, and wherein w and c each have a numerical value from about 0.10 to about 0.90.

18. The polymer of claim 17, wherein said structural blocks (IA-XII) and (IA) in said first polycarbonate polyurethane block polymer are randomly distributed, and said structural blocks (IB-XII) and (IB) in said second polycarbonate polyurethane block polymer are randomly distributed.

19. The polymer of claim 1, wherein each $R^1$ is hydrogen or deuterium, and each $R^2$ is methyl, trideuteromethyl, or trifluoromethyl.

20. The polymer of claim 1, wherein the weight average molecular weight of said polymer is between about 10 kg/mole and 500 kg/mole.

21. The polymer of claim 1, wherein said formula (IA) is derived from (R)(+)-5-hydroxy-3-(4-hydroxyphenyl)-1,1,3-trimethyl indane, and wherein said formula (IB) is derived from (S)(−)-5-hydroxy-3-(4-hydroxyphenyl)-1,1,3-trimethyl indane.

* * * * *

UNITED STATES PATENT AND TRADEMARK OFFICE
CERTIFICATE OF CORRECTION

PATENT NO. : 5,777,063
DATED : July 07, 1998
INVENTOR(S) : Gordon et al.

It is certified that error appears in the above-identified patent and that said Letters Patent is hereby corrected as shown below:

Col. 4, line 30, delete "1-f(m+n)" and replace with --1-f'(m+n)--.

Col. 9, line 27, delete "i-s" and replace with --1-s--.

Col. 9, line 53, delete "i-t" and replace with --1-t--.

Col. 12, line 13, delete "1-u" and replace with --1-v--.

Col. 12, line 24, delete "u" and replace with --v--.

Col. 26, line 60, delete "1-f(m+n)" and replace with --1-f'(m+n)--.

Col. 28, line 10, delete "the other of in" and replace with --the other of m--.

Col. 28, line 64, delete "i-s" and replace with --1-s--.

Col. 29, line 26, delete "i-t" and replace with --1-t--.

Col. 29, line 44, delete "(IA-X) II" and replace with --(IA-X) in--.

Col. 29, line 49, delete "wherein in" and replace with --wherein m--.

UNITED STATES PATENT AND TRADEMARK OFFICE
CERTIFICATE OF CORRECTION

PATENT NO. : 5,777,063
DATED : July 07, 1998
INVENTOR(S) : Gordon, et al

It is certified that error appears in the above-identified patent and that said Letters Patent is hereby corrected as shown below:

Col. 29, line 52, delete "part (1))" and replace with --part (b)--.

Col. 31, line 12, delete "1-u" and replace with --1-v--.

Col. 31, line 23, delete "u" and replace with --v--.

Signed and Sealed this

Fifth Day of January, 1999

Attest:

Attesting Officer

*Acting Commissioner of Patents and Trademarks*